United States Patent Office 3,405,573
Patented Oct. 15, 1968

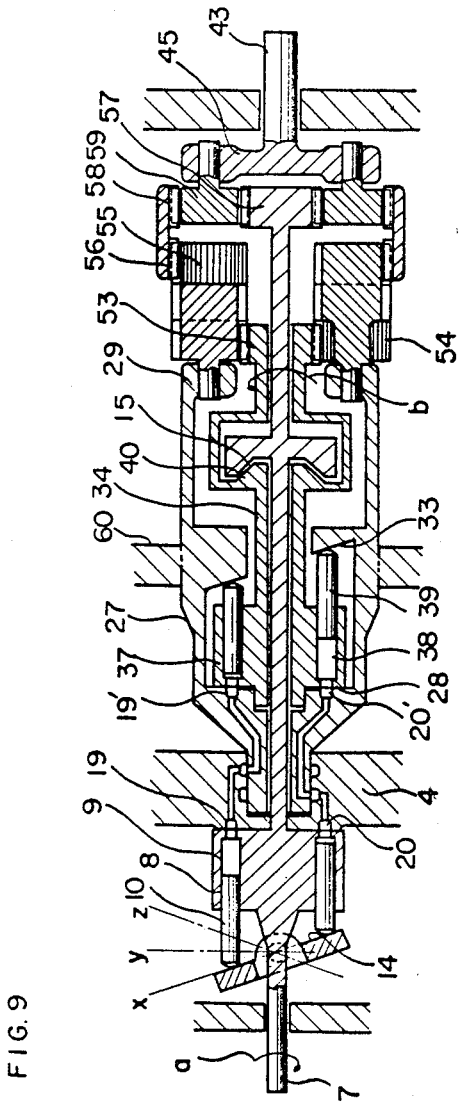

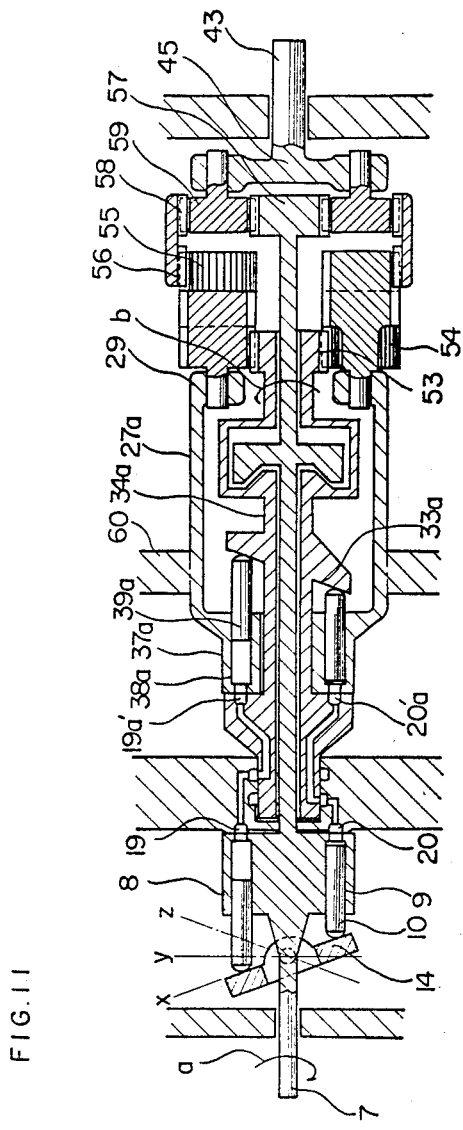
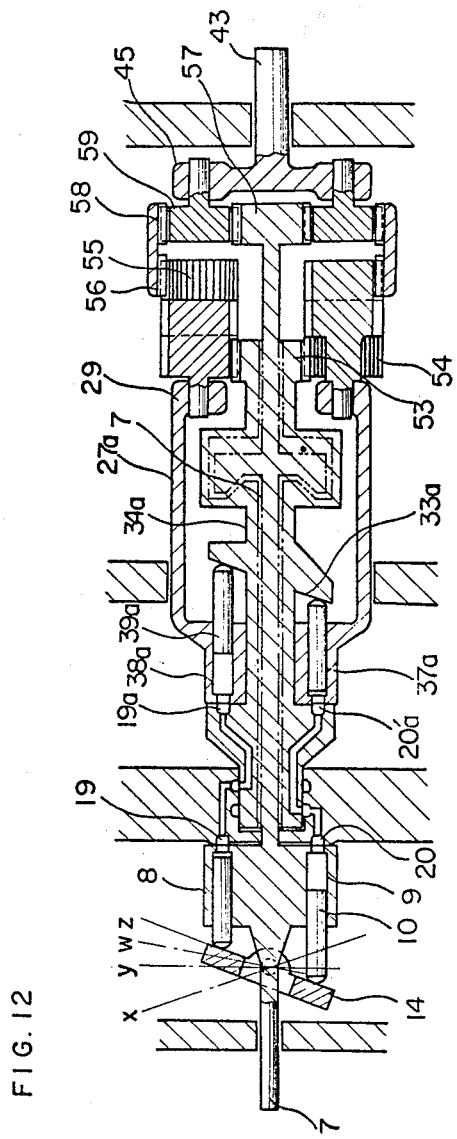
FIG. 11
FIG. 12

3,405,573
VARIABLE SPEED MECHANICAL HYDRAULIC TRANSMISSION MECHANISM ESPECIALLY SUITABLE FOR HEAVY VEHICLES
Toshio Takekawa, 17 Hamashinkai, 41-chome, Higashi-cho, Mizuho-ku, Nagoya, Japan
Filed Apr. 1, 1966, Ser. No. 539,540
Claims priority, application Japan, Aug. 26, 1965, 40/52,074
7 Claims. (Cl. 74—687)

ABSTRACT OF THE DISCLOSURE

A variable capacity fluid pressure pump is driven by an input shaft and either a rotary member formed as an integral part of a variable capacity fluid pressure motor, driven by the pump, or a rotary member, driven by the motor at a variable speed in the same or opposite direction to that of the input shaft rotation, is either restrained from or engaged with the input shaft by two sets of clutch means (one being an internal friction clutch and the other an external brake band) capable of alternately actuating said rotary members and interlocked speed change gears are provided between the output shafts of the two rotary members and an output shaft, so that a low speed and high torque power is obtained in a stepless variable transmission especially suitable for heavy vehicles.

---

This invention is related to a variable speed mechanical hydraulic transmission mechanism and more particularly to such a transmission mechanism especially suitable for stepless variable transmission at low speed and high torque in heavy vehicles, such as trucks, buses, diesel cars, etc., and also suitable for such transmission in powered rolling stock, machine tools, and other general industrial machineries. According to the transmission mechanism of the invention, for a certain revolving speed of an input shaft, the revolving speed of an output shaft can be varied from zero r.p.m. to the same speed as that of said input shaft in a stepless manner, and at the same time, the magnitude of the output torque is varied in proportion to the inverse of the revolving speed of the output shaft by using a combination of well coordinated gears and clutches capable of magnifying the torque at a high ratio in order to obtain an output torque variable in a wide range, thereby it is made possible to have a large torque at a low revolving speed and to eliminate any speed fluctuations during slow speed operation, thus smooth and quiet transmission of rotation and torque is made available for the entire range of speed conversion, and furthermore, so-called overdrive or production of a higher revolving speed of the output shaft than that of the input shaft, is also made attainable.

In a preferred embodiment of the invention, there are provided a fluid pressure pump of variable capacity to be driven by an input shaft and a fluid pressure motor of fixed capacity or variable capacity to be driven at a variable speed by said fluid pressure pump, thereby a wide range of speed conversion ratio between the input and the output shafts is obtained to produce a higher speed, the same speed or an increased speed at the output shaft as compared with the input shaft speed. At the same time an extremely wide range of output torque is made obtainable, which is inversely proportional to said speed conversion ratio between the input and output shafts. Furthermore, the shaft horsepowers driving power of the output shaft can be at low speed rotation made large in accordance with the transmission mechanism of the invention while allowing the stepless control of the rotating speed of the output shaft and accordingly speed fluctuations when the output shaft is rotated at a low speed for instance speed fluctuations encountered during the start of heavy vehicles or the start of heavily loaded devices, are eliminated completely. Thus, smooth and quiet start of heavily loaded machines, such as heavy vehicles, is made possible without any failure.

According to the transmission mechanism of the invention, the speed regulation of the output shaft can be carried out in a very quiet and stepless manner simply by using two sets of clutch means to be actuated alternately in order to retain one of two rotary members or to connect the other of the two rotary members to the input shaft. Accordingly, the control or modification of the output shaft rotating speed under loaded conditions can be done very easily over an extensive range without necessitating any complicated operations, such as change over of multi-step transmission gears and the like.

Thus, the present invention contributes greatly to the art of transmission mechanism.

For a better understanding of the invention, reference is made to the accompanying drawings, in which;

FIGS. 9 and 10 are diagrammatic illustrations showing the operative principles of the device of FIG. 1;

FIGS. 11 and 12 are views similar to FIGS. 9 and 10 and respectively showing operative principles of the device of FIG. 2;

Figure 1:
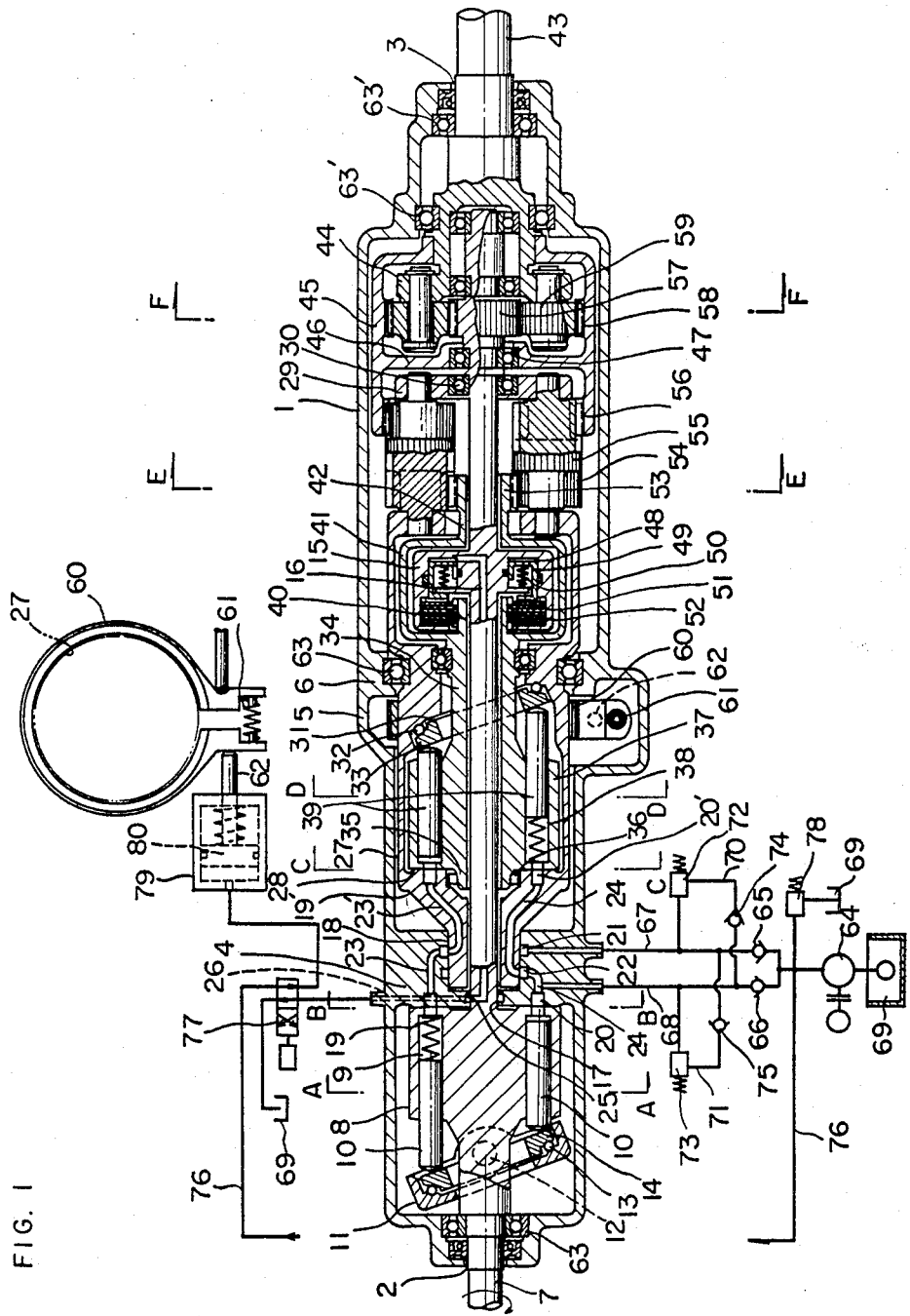
FIG. 1 is a longitudinal sectional view of a transmission mechanism embodying the invention, taken on the line G—G of FIGS. 3 to 6.
Figure 3:
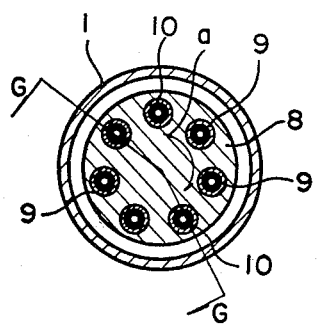
FIGS. 3 to 8 are transverse sectional views taken on lines A—A, B—B, C—C, D—D, E—E, and F—F respectively of FIG. 1.

Referring to FIG. 1, the reference number 1 designates an outside framework having an opening 2 located at one end thereof to insert an input shaft 7 and another opening 3 located at the opposite end thereof to bear an output shaft 43, 4 a distributing valve means extending toward the axial center line of the framework at an intermediate position thereof, 5 a brake band means, and 6 a bearing support portion. The input shaft 7 is inserted through the opening 2 and extends from said opening 2 through substantial portion of the framework to the proximity of the opening 3 for bearing the output shaft 43. An input side rotor 8 is formed rigidly on the shaft 7 in such a manner that said rotor may make direct contact with left hand side end surface of said distributing valve means 4 by enlarging the diameter of the shaft 7 at the corresponding portion thereof as shown in the figure. Odd numbers of input side cylinders 9 are formed in said rotor 8 in parallel with the axial center line of the shaft 7 at a uniform angular interval along the periphery of said rotor, as shown in FIG. 3. The rear end of each said cylinder 9, which has a reduced diameter, is adapted to face with either of the crescent-shaped pressure fluid grooves 19 and 20 respectively formed in said distributing valve means 4, groove 19 being located on one side of a vertical line passing the axial center line of the shaft 7 while groove 20 is on the opposite side thereof, as viewed in FIG. 4.

A shaft means or pin 12 is pivoted by the outside framework 1 so that the axial center line of said shaft means 12 may intersect with the axial center line of the input shaft 7 at right angle. The inclination of an inclinable plate 11, which is loosely fitted so as to surround the input shaft 7, can be adjusted by turning the outer end of said pin 12 at the outside of the framework 1, and an input thrust ring 14 is mounted on said inclinable plate 11 through thrust bearing balls 13 inserted between them. The thrust ring 14 is in turn brought into contact with left hand side end of each input side piston 10 inserted in each said cylinder 9. The input shaft 7 is further extended from the input side rotor 8 through the central opening 17 of the distributing valve means 4 while making close contact with the inner surface of said opening to have a multi-plate clutch frame 15 formed as an integral part of the shaft 7 and to have a sun-gear 57 secured at the proximity of the right hand side end of the shaft 7, as shown in FIG. 1.

There is an annular groove 25 formed on the inner surface of said central opening 17 so as to communicate the groove 25 with an outside piping means through a communicating passageway 26 formed in the outside framework 1, and another passageway 16 extends from said annular groove 25 to said multi-plate clutch frame 15 along the axial center line of the shaft 7.

Besides said pressure fluid grooves 19, 20, annular groove 25, and communicating passageway 26, the distributing valve means 4 is provided with an enlarged central opening 18 adjacent to said central opening 17, and two parallel annular grooves 21, 22 are formed on the inner surface of said enlarged central opening 18, said annular groove 21 being communicated with said passageway 19 through a communicating bore 23 while said annular groove 22 communicates with the passageway 20 through a communicating bore 24.

A rotary frame 27 extends from the right hand side end of said central opening 17 to the right hand side end of said multi-plate clutch frame 15 so as to surround said input shaft 7, and the left hand side end of said rotary frame 27 is shaped into a shaft to be fitted in said enlarged central opening 18 of the distributing valve means 4 to be supported thereby while the intermediate portion of said rotary frame 27e is supported by the inner surface of a bearing 63 secured to a bearing support portion 6 of the outside framework 1. A pair of crescent-shaped pressure fluid grooves 19', 20' are formed on a vertical surface 28 of said shaft portion of the rotary frame 27, so that said groove 19' may be communicated with said groove 19 of the distributing valve means 4 through a communicating passageway 23' of said shaft portion, said annular groove 21, and said passageway 23 of the valve means 4, while said groove 20' is communicated with said groove 20 through a communicating passageway 24', said annular groove 22, and said passageway 24, regardless of the angular position of said rotary frame 27.

A gear shaft supporting frame 29 is formed at the right hand side end of the rotary frame 27 as an integral part thereof and said frame 29 is in turn supported by a bearing 30 so as to rotate around the input shaft 7.

Figure 5:
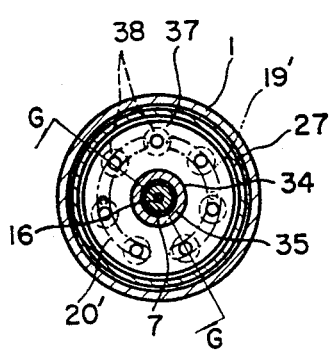
Figure 6:
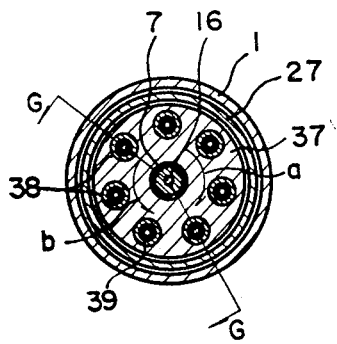

Within the rotary frame 27, there is mounted an inner rotary frame 34 so as to rotate around the input shaft 7, and the extreme left hand side end 35 of said frame 34 is supported by the intermediate portion of the rotary frame 27 through a bearing means 36 in a rotatable manner. The left hand side end portion of the inner rotary frame 34 is enlarged to form an output side rotary 37, and the same odd numbers of output side cylinders 38, as that of the input side cylinders 8, are formed in said rotor 37 in parallel at a uniform interval along the periphery of said rotor 37, each of said output side cylinders having the same diameter as that of said input side cylinder 8. The left hand side end openings of each of the cylinders 38, which have reduced diameters, are so disposed as to face to the pressure fluid grooves 19' and 20' bored on the vertical surface 28 of the rotary frame 27. A thrust ring 33 is inserted in the rotary frame 27 so as to contact with an inclined surface 31 through thrust balls 32 between them, said inclined surface 31 being formed within said rotary frame 27 at a certain angular position relative to the axial center line thereof. Said thrust ring 33 also makes contact with the right hand side ends of each piston 39 inserted in each said output side cylinder 38 so as to retain said thrust ring 33 loosely between the inner rotary frame 34 and the rotary frame 27 while keeping a certain angular positive relative to the axial center line of the frame 34. The inclination of said thrust ring 33 is so selected that when the rotary frame 27 is in a position to have the crescent shaped pressure fluid groove 19' of the vertical surface 28 on the left hand side of a vertical line passing the axial center line of the frame 27 while having the other pressure fluid groove 20' on the right hand side of said vertical line in a symmetrical manner as viewed from the opening 2 to support the input shaft, as shown in FIG. 5, then the uppermost end of the thrust ring 33 is closest to said vertical surface 28 while the lowermost end thereof is farthest from said surface 28. Said inner rotary frame 34 is provided with a clutch holding tubular portion 40, which extends into the inside space of the forementioned multi-plate clutch frame 15, and with an enlarged casing portion 41 to surround the outer surface of said frame 15. The output side of a sun-gear 53 is secured to said inner rotary frame 34 at a tubular portion 42 thereof formed to the left hand side end of said enlarged casing portion 41 so as to surround the input shaft 7 with a narrow clearance between them. The sun-gear 53 is faced with the inner surface of the left hand side end of the gear shaft supporting frame 29, as viewed in FIG. 1.

An output shaft 43 is supported in the opening 3 at the right hand side end of the outside framework 1, and the inner end of the input shaft 7 is supported for rotation by bearing means provided at the inner surface of the hollow and enlarged end portion of the output shaft 43. Said hollow and enlarged portion provides another gear shaft supporting frame 44 which mounts third planet gears as will be described hereinafter.

A cylindrical internal gear frame 45 is provided so as to surround both the right hand side end of said gear shaft supporting frame 29 of the rotary frame 27 and said gear shaft supporting frame 44 of the output shaft 43. The inwardly extending rib 46 of the internal gear frame 45 is rotatably supported around the input shaft 7 by a bearing means 47 at an intermediate position between the frames 29 and 44 while restraining the movement of the frame 45 in the axial direction of said shaft by a suitable holding means.

In said multi-plate clutch frame 15, there is provided a cylinder portion 48 having an opening communicated with the passageway 16 at right hand side end thereof, and an annular piston 49 is fitted in said cylinder portion 48 so as to be urged against said right hand side end of the cylinder communicated with the passageway 16 by springs 50. A plurality of clutch plates 51 are secured to said frame 15 at the front chamber thereof in such a manner that no rotation of the plates 51 is allowed with respect to the frame 15. A plurality of cooperating clutch plates 52 are secured to the clutch plate holding tubular portion 40 of the frame 34 in a nonrotatable manner with respect to said frame 34 and each said clutch plate 52 is substantially superposed with each said clutch plate 51 alternately along the axial direction of the input shaft 7 with a variable spacing between them, while allowing relative movement between them only in said axial direction. Upon leftward movement of the annular piston 49 against the elastic force of the springs 50, the clutch plates 51 and 52 are brought into direct contact between each other and the clutch is engaged to transmit the rotation of the input shaft 7 to the inner rotary frame 34.

In the gear shaft supporting frame 29 located at the rear end of the input shaft 7, there are mounted shafts of first planet-gears 54 to be engaged with the output sun-gear 53 and second planet-gears 55 to be engaged with said gears 54, wherein said shafts are mounted in parallel with the axial center line of the input shaft 7. The second planet-gears 55 are also engaged with a first internal gear 56 formed on the inside surface of the internal gear frame 45.

On the other hand, in the gear shaft supporting frame 44 located at the front end of the output shaft 43, there are mounted shafts of third planet gears 59, which are engaged with both the sun-gear 57 at the rear end of the input shaft 7 and the second internal gear 58 formed on the inside surface of the internal gear frame 45.

A brake band 60 is provided in the brake band means 5 so as to surround the rotary frame 27. Said brake band 60 is normally kept at its expanded or released position by means of a spring 61, and in order to restrain the rotation of the rotary frame 27, the brake band 60 is moved into its contracted or closed position by means of a plug 62 inserted through the outside framework 1 so that said brake band 60 may be urged tightly against the rotary frame 27.

To facilitate the rotation of the input shaft 7 and the output shaft 43, there are provided bearings 63 and 63' at the front and rear ends, respectively, of the outside framework 1.

The output side of a fluid pressure pump 64 is communicated with the annular groove 21 through a piping 67 having a check valve 65 and, at the same time, with the annular groove 22 through a piping 68 having a check valve 66; thereby the oil in an oil tank 69 is pressurized and delivered to said annular grooves. In a return oil pipe 70 extending from the piping 67 to the piping 68 and also in another return oil pipe 71 extending from the piping 68 to 67, there are provided safety valves 72 and 73 respectively together with check valve 74 and 75 respectively in order to prevent interference of oil pressure between said pipings.

Another piping 76 extends from the fluid pressure pump 64 to a change-over valve 77 to deliver pressure fluid selectively to the communicating passageway 26 and to a fluid cylinder 79. A pressure regulating valve 78 is connected to said piping 76, and a piston 80, formed as an integral part of the plug 62 to tighten the brake band 60, is fitted in the cylinder 79.

Figure 2:
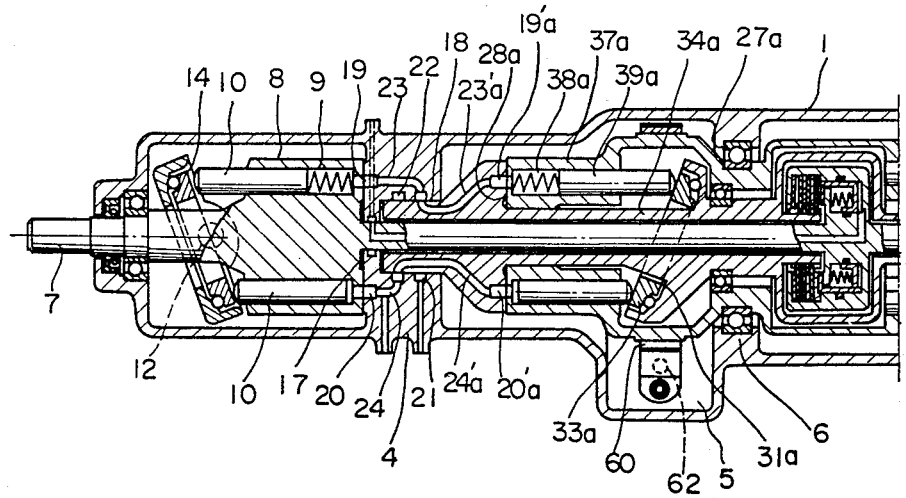
FIG. 2 is a partial sectional view similar to FIG. 1 illustrating another embodiment of the invention.

In another embodiment of the invention shown in FIG. 2, the front shaft portion of an inner rotary frame 34a is fitted in the enlarged central opening 18 of the outside framework 1, and said inner rotary frame 34a is provided with a vertical surface 28a, pressure fluid grooves 19a', 20a', communicating holes 23a', 24a', and an inclined surface 31a in similar manner to those in the rotary frame 27 of the preceding embodiment of the invention shown in FIG. 1. A thrust ring 33a is fitted to the rotary frame 34a in the opposite direction to that in FIG. 1. An output rotor 37a comprising output side cylinders 38a and output side pistons 39a is formed as an integral part of a rotary frame 27a in a similar manner to the corresponding output rotor 37 in the inner rotary frame 34 shown in FIG. 1. The remainder of the construction of the embodiment shown in FIG. 2 is the same as that of the preceding embodiment shown in FIG. 1.

The operation of stepless speed conversion in the device of FIG. 1 will now be described in detail, provided that the input side rotor 8 and the output side rotor 37 are used as a fluid pressure pump and a fluid pressure motor respectively.

(a) If the change-over valve 77 assumes the position as shown in FIG. 1, the pressure fluid is delivered to the cylinder 79 and the plug 62 is pushed forward to tighten the brake band 60 to restrain the rotation of the rotary frame 27. On the other hand, no pressure fluid is supplied to the clutch frame 15, and hence the inner rotary frame 34 is disengaged from the input shaft 7 so that they may be freely and relatively rotated.

Figure 4:
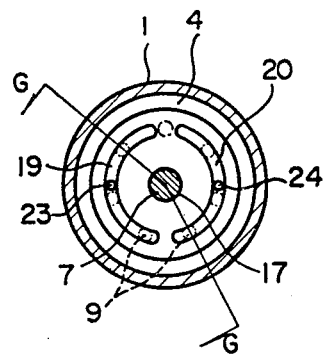

Referring to FIG. 9 illustrating the conditions of the transmission mechanism of the invention with the changeover valve 77 at the position shown in FIG. 1, if the thrust ring 14 is inclined with respect to the pressure fluid grooves 19 and 20 by setting the shaft means 12 so that said inclination of the trust ring 14 may coincide with that of the thrust ring 33 with respect to pressure fluid grooves 19' and 20', as shown by the position $x$ in FIG. 9, then as the input shaft 7 is rotated in the direction as shown by an arrow $a$, the pistons 10 in the input side rotors 8 are reciprocated along the axial directions thereof by the engagement between the thrust ring 14 and the front ends of each piston 10. Those pistons 10 which are in cylinders 9 facing the pressure fluid groove 19, which is on the right hand side of the input shaft 7 in FIG. 4, are pushed toward said groove 19 responsive to the rotation of the rotor 8 in the direction of the arrow $a$ to deliver the fluid in said cylinders 9, facing the pressure fluid groove 19, to the fluid pressure groove 19' formed on the vertical surface 28 of the rotary frame 27 through said groove 19, communicating hole 23, annular groove 21, and communicating hole 23'. Accordingly, pistons 39 in those cylinders 38 of the output side rotor 37, which face the pressure fluid groove 19', are pushed away from the vertical surface 28 to push the thrust ring 33 by the rear ends thereof. Due to the fact that said thrust ring 33 is held stationary together with the rotary frame 27 by the brake band 60, said pistons 39 slide on the surface of the thrust ring 33 in the direction of an arrow $b$ in FIG. 9 to rotate the output side rotor 37 in the same direction.

The pistons 39 located in those cylinders 38 in the output side rotor 37 which face with the fluid pressure groove 20' are pushed toward the vertical surface 28 by means of the inclination of the thrust ring 33, and accordingly, the fluid in said cylinders 38 facing the groove 20' is delivered back to the pressure fluid groove 20 to push those pistons 10 in the cylinder 9 in the input side rotor 8 facing the groove 20 toward the opening 2, until such pistons 10 and cylinders 9 are moved to the opposite side of the vertical plane passing the axial center line of the input shaft 7, where the fluid in the cylinders 9 is delivered to the groove 19 as described in the above.

In other words, if the rotary frame 27 is kept stationary, and further if the thrust rings 14 and 33 are inclined by the same angle, then the flow rate of fluid delivered out of the input side rotor 8, acting as a fluid pressure pump, coincides with the flow rate delivered to the output side rotor 37 acting as a fluid pressure motor, and, accordingly, rotors 8 and 37 rotate at the same speed in opposite directions, and thence the relative rotating speed of the output side rotor 37 is zero.

(b) As the inclination of the thrust ring 14 is varied from the position shown by the line $x$ to the position $y$ shown by a chain line in FIG. 9, which is perpendicular to the axial center line of the input shaft 7, by controlling the shaft means 12, the stroke of the pistons 10 is reduced, causing reduction in the flow rate of fluid delivered out of the input side rotor 8, and, accordingly, the reciprocation of the pistons 39 in the output side rotor 37 is slowed down to reduce the rotating speed of the rotor 37 in the direction of the arrow $b$. Upon placing the thrust ring 14 at the position $y$, perpendicular to the axial direction of the input shaft 7, the flow of said fluid between the two rotors is interrupted, and hence the rotating speed of the output rotor 37 is reduced to zero.

(c) As the thrust ring 14 is further inclined gradually from said upright position $y$ to the position $z$ shown by a dotted line in FIG. 9, those cylinders 9, which face with the pressure fluid groove 20, begin to deliver the fluid while other cylinders, facing the groove 19 begin to receive the fluid, which means the fluid flow in the opposite direction to that when the thrust ring 14 is at the position $x$, and hence said pistons 10, facing the groove 20 are pushed toward the pressure fluid groove 20 due to their contact with the thrust ring 14 in order to deliver fluid to the pressure fluid groove 20' through the groove 20, communicating hole 24, annular groove 22, and communicating hole 24'. Accordingly, the fluid is delivered to those cylinders 38 in the output side rotor 37 which face with the groove 20' to push pistons 39 located therein against the thrust ring 33, resulting in the sliding of said pistons in the same direction as that of the input side rotor rotation, as shown by the arrow $a$. Thus, the output side rotor 37 is also rotated in the direction shown by the arrow $a$ at a speed varying gradually from zero to the same speed as that of the input side rotor 8 in a stepless manner.

If the thrust ring 14 is inclined to the position $z$ to give the maximum speed conversion to the output side rotor 37, and further if the change-over valve 77 is turned to the opposite side to that shown in FIG. 1, then the delivery of the pressure fluid to the cylinder 79 is interrupted to release the brake band 60 to allow rotation of the rotary frame 27, and, at the same time, the pressure fluid is delivered to the multi plate clutch frame 15 through the passageway 16 to engage the clutch by moving the annular piston 49 forward; thereby the inner rotary frame 34 is rotated as an integral part of the input shaft 7, as illustrated in FIG. 10.

(d) Referring to FIG. 10, upon engaging the clutch in the frame 15, while maintaining the inclination of the thrust ring 14 at the position $z$ as shown in FIG. 9, those pistons 10 located in the cylinders of the input side rotor 8, facing the pressure fluid groove 20 shown on the left hand side of FIG. 4, are moved toward said groove 20 responsive to the rotation of the input shaft 7 in the direction of the arrow $a$ and, accordingly, pressure fluid is delivered to the groove 20' and further to the cylinders 38 of the output side rotor 37 to move the pistons 39 located therein. However, the output side rotor 37 is now rotating as an integral part of the input shaft 7, as described above, and there is a resistance acting on the rotatable rotor 27 against its rotation, such as resistance due to load, and hence, those pistons 39 thus moved away from the vertical surface 28 slide smoothly along the surface of the thrust ring 33 at a portion facing the groove 20'; thereafter said pistons 39 are pushed by the inclined surface of the ring 33 facing the groove 19' to move in the cylinder 38 toward the groove 19'. Thus, the pressure fluid is delivered to cylinders in the input side rotor 8 through the groove 19 to push the pistons 10 against the inclined surface of the thrust ring 14, which means that the pressure fluid moves back and forth between rotors 8 and 37 due to the inclination of the thrust rings 14 and 33, and, accordingly, both the thrust ring 33 and the rotary frame 27 are kept stationary.

(e) If the thrust ring 14 is kept at a certain preselected intermediate position $w$ between positions $y$ and $z$ to reduce the stroke of the pistons 10 in the input side rotor 8 by one half, then the pistons 39 in the output side rotor 37 make one full stroke movement responsive to two rotations of the rotor, and hence both the thrust ring 33 and the rotary frame 27 are rotated in the same direction following the rotation of the input shaft 7 at a speed equivalent to one half of the axial speed of the shaft 7. The output torque of the rotary frame 27 is reduced at a rate inversely proportional to its speed conversion ratio.

(f) Upon placing the thrust ring 14 at its upright position $y$ perpendicular to the axial direction of the input shaft 7, the pistons 10 and 39 in the input side rotor 8 and the output side rotor 37 are not moved at all, and hence there is produced a coupling between the pistons 39 and the thrust ring 33 to rotate the rotary frame 27 at the same speed and in the same direction as the input shaft 7.

(g) Upon inclining the thrust ring 14 to its position $x$, the rotary frame 27 is rotated at a speed twice as fast as that of the input shaft 7, which is an overdrive condition.

FIG. 11 illustrates the major portion of the embodiment of the invention shown in FIG. 2, in which the brake band 60 is tightened or contracted to retain the rotary frame 27a stationary. In this case, the output side rotor 37a is also retained stationary by means of the brake band 60, and hence, if the thrust ring 14 is located at the position $x$, where the inclination of the ring 14 is contrary to that of the thrust ring 33a, the inner rotary frame 34a is rotated at the same speed but in the opposite direction to the input shaft 7, as described in the preceding paragraph (a) referring to FIG. 9 showing the thrust ring 14 at the position $x$. The operations of the transmission mechanism of FIG. 2, with its thrust ring 14 at positions $y$ and $z$ or any other intermediate positions, are the same as those of the device of FIG. 1 with the thrust ring 14 at respective positions, which has been already described hereinbefore in reference to FIG. 9.

In the embodiment of the invention shown in FIG. 2, if the thrust ring 14 is placed at the position $z$ as illustrated in FIG. 11, and furthermore if the brake band 60 is released or expanded while delivering pressure fluid to the multi plate clutch frame 15, then both the rotary frame 27a and the output side rotor 37a become rotatable and the inner rotary frame 34a is connected to the input shaft 7 as an integral part thereof, as shown in FIG. 12. The movements of the rotary frame 27a responsive to the rotation of the input shaft 7 with the thrust ring 14 at positions $z$, $w$, $y$, and $x$ are the same as those of the rotary frame 27 described hereinbefore in reference to FIG. 10.

According to the invention as described in the foregoing referring to the embodiments thereof, a variable capacity fluid pressure pump is driven by an input shaft, and either a rotary member formed as an integral part of a variable capacity fluid pressure motor driven by said fluid pressure pump or a rotary member to be driven by said fluid pressure motor at a variable speed in the same or opposite direction to that of the input shaft rotation is either restrained from or connected to the input shaft by means of two sets of clutch means, namely, clutch means 51, 52 and brake band 60, capable of alternately actuating said rotary members, and furthermore, interlocked speed change gears are provided between the shafts of said two rotary members and an output shaft, so that a low speed high torque power may be obtained. The operation of speed change gears in the transmission mechanism of the invention will now be described in still further detail.

Figure 7:
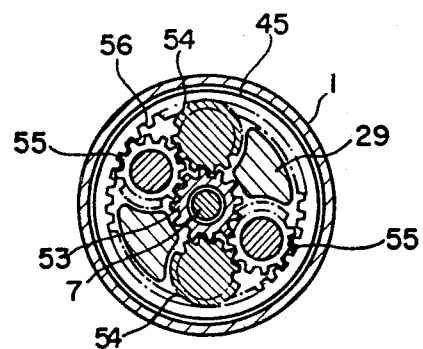
Figure 8:
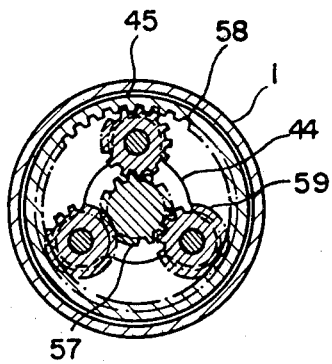

Referring to FIGS. 7 and 8, it is assumed for simplicity that the input sun-gear 57 and each of the third planet-gears 59 have the same number of gear teeth while the output sun-gear 53 and each of the first and second planet-gears 54, 55 also have the same number of gear teeth, and furthermore, that the gear ratio between each of the first and second internal gears 56, 58 and each of said gears 53, 54, 55, 57 and 59 is 3:1.

(I) If the thrust ring 14 is placed at the position $x$ as shown in the preceding paragraph (a) referring to FIGS. 9 and 11, while retaining the gear shaft holding frame 29 (rotary frame 27) stationary, and, furthermore, if the input shaft 7 is rotated in a clockwise direction, as seen from the opening 2 toward the opening 3, while rotating the inner rotary frame 34 at the same rotating speed in a counterclockwise direction, as viewed from the same direction, then as the output sun-gear 53 makes one full rotation in a counterclockwise direction, the second planet-gear 55 is also rotated by 360 degrees in the same counterclockwise direction around its own axis through the first planet-gear 54 without making any revolution around the axial center line of the input shaft 7, and, at the same time, the first and the second internal gears 56 and 58 are rotated in the same counterclockwise direction by ⅓ of a rotation. On the other hand, as the input sun-gear 57 makes a full rotation around its own axis, in a clockwise direction as viewed from the opening 2 toward the opening 3, the third planet-gears 59 are rotated by 360 degrees in the opposite direction or in a counterclockwise direction and, at the same time, said planet gears 59 are revolved in a clockwise direction by ⅓ of a full revolution with respect to the second internal gear 58; thereby the gear shaft supporting frame 44 and accordingly the output shaft 43 are kept stationary.

(II) If the inclination of the thrust ring 14 is gradually changed from the position x to the position y as described in the preceding paragraph (b) referring to FIGS. 9 and 11, or as the speed ratio between the rotation of the input sun-gear 57 and the rotation of the output sun-gear 53 in the opposite direction to that of the sun-gear 57 is gradually varied while reducing the rotating speed of the clockwise rotation of the output sun-gear 53, the output shaft 43 begins to rotate in a clockwise direction in a stepless manner. When the thrust ring 14 is placed at the position y, the inner rotary frame 34 and, accordingly, the output sun-gear 53 are kept stationary, and hence, the first and the second planet-gears 54, 55 are stopped, together with the internal gear frame 45, thereby only the third planet-gears 59 are revolved around the axial center line of the input shaft 7 by means of the input sun-gear 57 to drive the gear shaft holding frame 44 and accordingly the output shaft 43 in a clockwise direction by ¼ of a full rotation per one full rotation of the input shaft 7.

(III) When the inclination of the thrust ring 14 is further varied gradually from the position y to the position z as described in the preceding paragraph (c) referring to FIGS. 9 and 11, the input sun-gear 57 begins to rotate in the same direction as that of the output sun-gear 53. When both sun-gears 53 and 57 are rotated at the same axial speed, responsive to one full rotation of the output sun-gear 53 in a clockwise direction, the internal gear frame 45 is rotated in the clockwise direction by ⅓ of a full rotation through the first and the second planet-gears 54 and 55, which is to be added to the revolution of the third planet-gears 59 around the axial center line of the input shaft 7 through the second internal gear 58, and thereby the rotation of the gear shaft holding frame 45 and, accordingly, that of the output shaft 43 are increased from said ¼ of a rotation to ½ thereof for one full rotation of the input shaft 7 in the same direction as that of the input shaft 7.

(IV) As described in preceding paragraphs (e) and (f), if the brake band 60 is released while holding the thrust ring 14 at its position z, as illustrated in FIGS. 10 and 12, in order to make the rotary frame 27 and, accordingly, the gear shaft holding frame 29 rotatable and at the same time to connect the inner rotary frame 34 to the input shaft 7, as an integral part thereof, so as to roate the output sun-gear 53 always in conjunction with the input sun-gear 57 in a clockwise direction, and furthermore, if the inclination of the thrust ring 14 is varied gradually from the position z to the position y through the position w to cause a clockwise rotation of the gear shaft holding frame 29 (rotary frame 27), then the revolving speed of the output shaft 43 is gradually increased further from said ½ rotation of the input shaft 7 to a full rotation thereof. When the inclination of the thrust ring 14 is set to the position y, then the rotary frame 27, the output sun-gear 53 and the gear shaft holding frame 44 are rotated at the same speed as that of the input shaft 7, and at the same time, the first and the second planet-gears 54, 55, the internal gear frame 45 and the third planet-gears 59 are brought into a coupled condition with the sun-gears 53, 57 or into a relatively stationary position, thereby the output shaft 43 is rotated at the same speed as that of the input shaft 7. Thus, the transmission mechanism is operated at its so-called top rotation.

(V) When the inclination of the thrust ring 14 is further varied from the position y to the position x, as described in the preceding paragraph (g) referring to FIGS. 10 and 12, the gear shaft holding frame 29 begins to rotate in a clockwise direction at a speed higher than that of the output sun-gear 53, thereby the output shaft 43 is operated in the so-called over-drive region.

Figure 13:
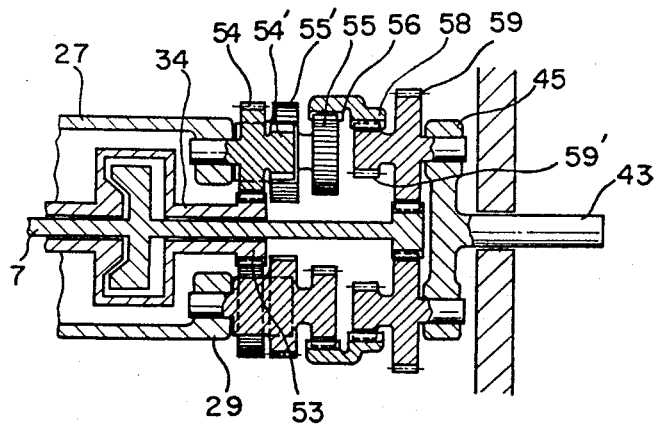
FIG. 13 is a vertical sectional view illustrating a gearing means to be used in the mechanism of the invention.

In the embodiments of the invention described in the foregoing, the numbers of gear teeth in the 1st, 2nd and 3rd planet-gears are assumed to be the same, and so are numbers of gear teeth in the 1st and 2nd internal gears, however, other arrangements are also permissible. For instance, FIG. 13 illustrates another embodiment of the invention, in which a pinion 54' secured coaxially to the first planet-gear 54 is engaged with a large gear 55' mounted coaxially with the second planet gear 55 while engaging the second planet gear 55 with the first internal gear 56, and furthermore, the second internal gear 58, having less gear teeth than those of the first internal gear 56, is engaged with a pinion 59' coaxially mounted to the third planet-gear 59, thereby the speed conversion ratio between the input shaft 7 and the output shaft 43 can be increased while allowing modification of the maximum torque available at the output shaft 43 in a wider range.

Besides, certain properties of the transmission mechanism, such as the speed conversion ratio and the maximum available torque at the output shaft, can be modified by varying the constants of certain elements in the mechanism, for instance the maximum torque produced by the fluid pressure pump and motor, the gear ratio in various gearing means in the mechanism, etc.

Table 1 shows the ratio of the maximum torque available in the output shaft of the transmission mechanism of the invention comprising gearing means as shown in FIG. 1 to the input torque for various constants of elements in the mechanism, provided that the overall efficiency thereof is 100%, in which;

(A) is the magnification factor of maximum torque produced by the fluid pressure pump to that produced by the fluid pressure motor, provided that the maximum input torque is unity;

(B) is the number of gear teeth in the second internal gear assuming that the number of gear teeth in the input sun-gear is unity;

(C) is the conversion ratio of the rotating speed of the output shaft to that of the input shaft when the input shaft is rotated while holding the second internal gear stationary;

(D) is the number of gear teeth in the first internal gear assuming that the number of gear teeth in the output sun-gear is unity;

(E) is the ratio of the rotating speed of the first internal gear to that of the output sun-gear when the output sun-gear is driven while holding the rotary frame stationary;

(F) is the formula to give the maximum torque produced by the output shaft, which is represented by $$\frac{1}{(C)} \times (A) = (G)$$

and (G) is the maximum torque produced by the output shaft, which is determined by the formula of the preceding item (F).

TABLE 1

| (A) | (B) | (C) | (D) | (E) | (F) | (G) |
|-----|-----|-----|-----|-----|-----|-----|
| 1.5 | 2 | ⅓ | 2 | ½ | (1½)×1.5 | 4.5 |
| 2 | 3 | ¼ | 3 | ⅓ | (1⅓)×2 | 8 |
| 3 | 5 | ⅙ | 5 | ⅕ | (1⅕)×3 | 18 |
| 4 | 7 | ⅛ | 7 | ⅐ | (1⅐)×4 | 32 |

Figure 14:
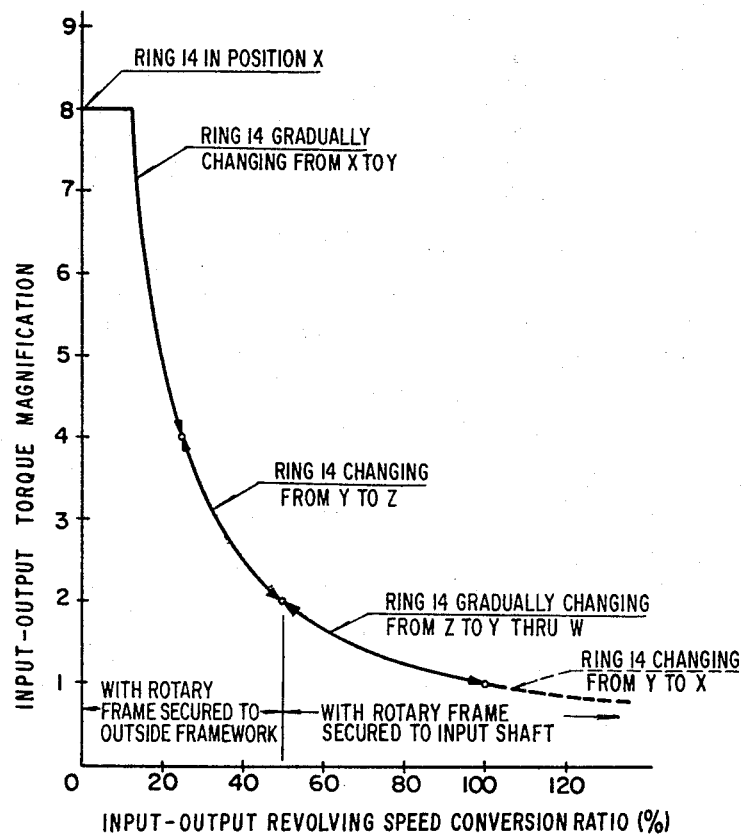
FIG. 14 is a curve representing the relation between the input-output revolving speed conversion ratio and the input-output torque magnification in the device of the invention.

FIG. 14 illustrates a curve representing the relation between the conversion ratio of the rotating speed of the output shaft to that of the input shaft and the ratio of the torque available on the output shaft and that on the input shaft in the transmission mechanism shown in FIGS. 1 and 2, provided that the overall efficiency thereof is 100%.

According to the invention, the type of fluid pressure pump to be driven by the output shaft and the type of the fluid pressure motor to be driven by said fluid pressure pump are not limited to those illustrated in the accompanying drawings as embodiments thereof but any suitable type fluid pressure pump and motor can be used effectively.

Besides, it is not necessary to coincide the axial center line of the first and second groups of gears with that of the fluid pressure motor or to align the axial center line of the first group of gears on a common line with that of the second group of gears, but the axial center line of the input shaft and that of the output shaft can be disposed in any suitable manner while arranging the related gears and fluid pressure devices in a most suitable fashion.

I claim:

1. A variable speed mechanical-hydraulic transmission, especially suitable for heavy vehicles, comprising an elongated casing having an input end and an output end, an input shaft extending longitudinally in the casing throughout almost the full length of the casing and being rotatably supported in the input end of the casing, an output shaft rotatably supported in the output end of the casing and extending a short distance into the casing, said output shaft having an enlarged inner end housed within the casing, said input and output shafts being disposed in axial alignment and the input shaft having an inner end rotatably supported in a recess formed in the inner end of the output shaft so that the shafts rotate relatively freely in alignment, a variable capacity fluid pressure pump housed in the casing and driven by the input shaft, a fluid pressure motor rotatably housed in the casing and hydraulically connected with and driven by the fluid pressure pump, a first rotary means structurally incorporated with the motor so as to rotate therewith as one body, a second rotary means driven by the first rotary means, clutch means and brake means alternately actuating said first and second rotary means for selective driven association thereof with the input shaft, said brake means lockingly restraining one rotary means in one period of time and the clutch means coupling the other rotary means to said input shaft in the other period of time, both of said rotary means having output ends disposed adjacent the inner end of the output shaft, a first planetary gearing having a sun gear fixedly carried by the output end of one of the rotary means and having planet gears carried by the output end of the other rotary means, a second planetary gearing having a sun gear fixed on the inner end of the input shaft and planet gears fixedly carried by the inner end of the output shaft, an intermediate gearing coupling the planet gears of the first planetary gearing to the planet gears of the second planetary gearing, and means for supplying pressure fluid to the pump and the motor.

2. The transmission of claim 1 wherein said input shaft has an enlarged portion disposed immediately inwardly of the casing at the input end of the casing, said fluid pump including penetrating grooves formed in such enlarged portion parallel to the rotary axis of the input shaft and with equal angular distance therebetween, pistons workingly housed in such grooves, said pistons having outer ends extending from the enlarged portion and facing the input end of the casing, spring means biasing the pistons in the direction of their outer ends, a swash plate pivotally mounted in the casing inwardly of the input end thereof and having a center opening through which the input shaft passes and having an inner surface engaging the outer ends of the pistons so that when the said surface of the swash plate is in a plane inclined to the axis of the input shaft the pistons may be successively reciprocated upon rotation of the input shaft to force fluid out of the grooves, said fluid pressure motor including an enlarged portion formed on the first rotary means and having a series of grooves identical to the grooves of the pump, pistons workingly housed in the last named grooves, spring means biasing said motor pistons toward the output end of the casing, a thrust disc arrangement pivotally carried by the other rotary means and engaged by the pistons of the motor and fluid conveying means communicating the grooves of the pump with the grooves of the motor whereby said fluid pressure motor is rotated relative to the fluid pump by resultant reciprocation of its pistons from the reciprocation of the pump pistons.

3. The transmission of claim 1 wherein the first rotary means is rotatably mounted on the input shaft and the second rotary means is rotatably mounted on the first rotary means so that both of said rotary means are rotatably disposed around the input shaft concentric thereto and in concentric rotary interrelation, said clutch means being disposed between the input shaft and the inner rotary means, and said brake means being structurally associated with the exterior of the outer rotary means.

4. The transmission of claim 3 wherein said pump includes an enlarged portion formed on the input shaft immediately inwardly of the input end of the casing, said enlarged portion being formed with a series of grooves disposed parallel with the rotary axis of the input shaft and in equally spaced angular relation, spring urged pistons working in the grooves, said pistons having outer spring urged ends directed toward the input end of the casing, a swash plate pivotally mounted in the casing and having a center opening through which the input shaft passes, said swash plate having a pressure surface in contact with the outer ends of the pistons, said motor including axial grooves formed in the inner rotary means, pistons working in such latter grooves, pressure fluid conveying means communicating the pump grooves with the motor grooves, and a thrust disc means for the motor carried by the outer rotary means and engaged by the motor pistons.

5. The transmission of claim 3 wherein said pump includes an enlarged portion formed on the input shaft immediately inwardly of the input end of the casing, said enlarged portion being formed with a series of grooves disposed parallel with the rotary axis of the input shaft and in equally spaced angular relation, spring urged pistons working in the grooves, said pistons having outer spring urged ends directed toward the input end of the casing, a swash plate pivotally mounted in the casing and having a center opening through which the input shaft passes, said swash plate having a pressure surface in contact with the outer ends of the pistons, said motor including axial grooves formed in the outer rotary means, pistons working in such latter grooves, pressure fluid conveying means communicating the pump grooves with the motor grooves, and a thrust disc means for the motor carried by the inner rotary means and engaged by the motor pistons.

6. The transmission of claim 2 wherein control means are provided for changing the inclination of the swash plate for the pump so as to vary the capacity of the pump depending upon the inclination of the plate relative to the axis of the input shaft.

7. The transmission of claim 3 wherein said clutch means is a fluid actuated multiple disc clutch, spring means acting on said disc clutch to normally retain it in a disengaged condition and said brake means includes a brake band, spring means retaining said brake band in a normal disengaged condition when the clutch means is in an engaged condition and fluid pressure means for actuating said brake means when the clutch means is in a disengaged condition.

References Cited

UNITED STATES PATENTS

| | | | |
|---|---|---|---|
| 2,075,118 | 3/1937 | Krell et al. | 74—687 |
| 2,599,814 | 6/1952 | Cull | 74—687 |
| 2,939,342 | 6/1960 | Woydt et al. | 74—687 |
| 3,132,534 | 5/1964 | Boehner | 74—687 |
| 3,283,612 | 11/1966 | Densham | 74—687 |

FRED C. MATTERN, JR., *Primary Examiner.*

ARTHUR T. McKEON, *Assistant Examiner.*